Patented May 20, 1952

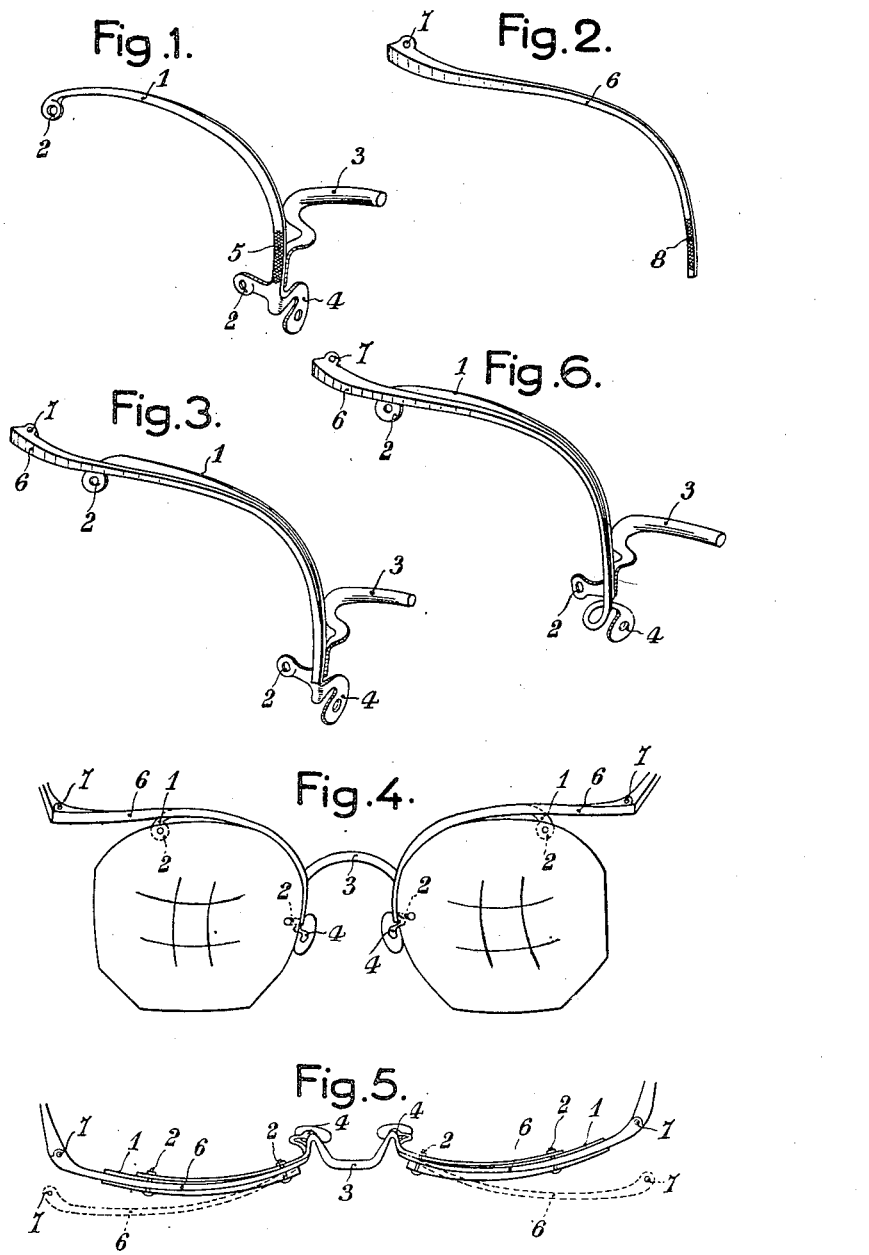

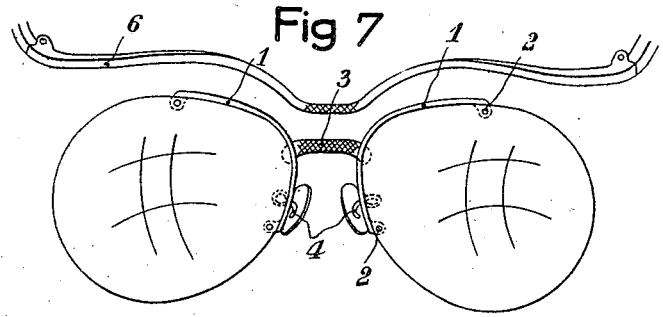
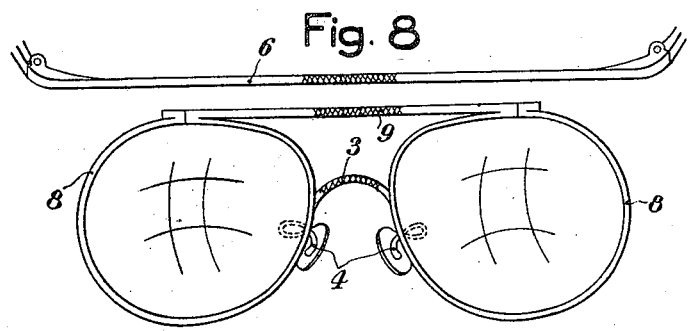
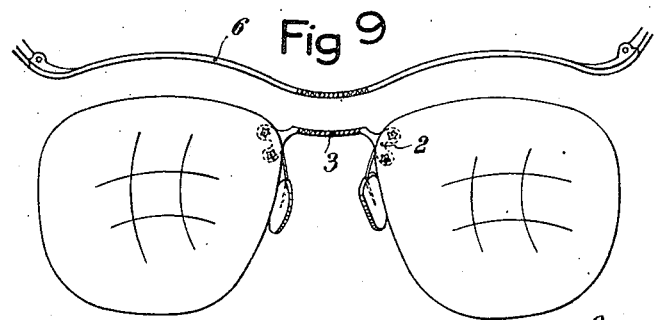
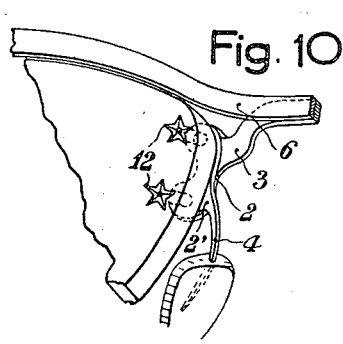
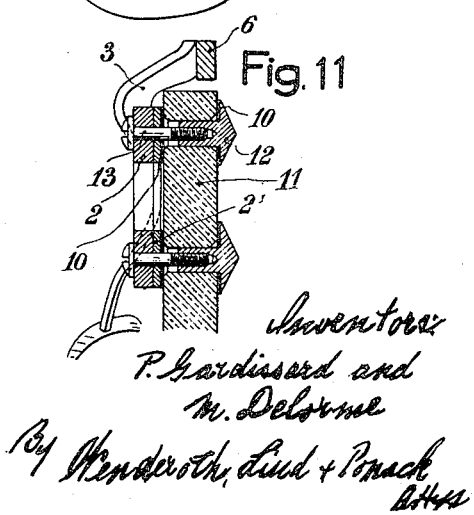

2,597,312

UNITED STATES PATENT OFFICE 2,597,312

SPECTACLES

Pierre Gardissard, Nice, and Marcel Delorme, Saint Mihiel, France, assignors to Societe Industrielle et Commerciale des Ouvriers Lunetiers (Eparvier, Cottet, Poichet & Cie), a joint-stock company, Paris (Seine), France Application March 2, 1950, Serial No. 147,234
In France March 3, 1949

1 Claim. (Cl. 88—41)

It is well known that generally an inconvenience with spectacles is that same are deformed to a greater or less extent as the bows are swung open, such a deformation being liable to become permanent with time. Besides, the stress imposed thereby upon the lenses may sometimes result in the breakage of the same.

The invention concerns improvements in spectacles which consist in associating the lens-carrying element with symmetrically arranged bow-carrying elements; preferably the latter are connected with the lens-carrying elements close to the bridge; they resiliently withstand resulting from the swinging of the bows to open and closed position without influencing the invariable position and shape of the lens-carrying elements.

In a modification of the invention the two bow-carrying elements are associated into one single element which in its turn is connected with the lens-carrying element.

Exemplary embodiments of spectacles according to the invention will be described more specifically hereinafter, reference being had to the appended drawings in which:

Figure 1 is a diagrammatical perspective view of a lens-carrying element;

Figure 2 is a diagrammatical perspective view of a bow-carrying element;

Figure 3 is a diagrammatical perspective view of the assemblage of the elements shown in Figs. 1 and 2;

Figure 4 is a diagrammatical front view of the spectacles;

Figure 5 is a diagrammatical plan view of the spectacles;

Figure 6 is a diagrammatical view of a detail modification;

Figure 7 is a diagrammatical view of a frameless pair of spectacles according to the invention;

Figure 8 is a diagrammatical view of a framed pair of spectacles according to the invention;

Figure 9 is a diagrammatical view of a further embodiment of a frameless pair of spectacles;

Figure 10 is a diagrammatical view of a detail;

Figure 11 is a sectional view of the aforesaid detail.

The invention consists in associating an element adapted to carry the lenses and to keep them in an invariably correct manner in front of the wearer's eyes with a pair of bow-carrying elements adapted to resist the stresses imposed upon the bows without influencing the position of the lenses.

Fig. 1 diagrammatically shows how the lens-carrying element is constituted. Said element is composed of a pair of preferably yet not necessarily resilient curved arms 1 provided each with a pair of tapped ears 2 adapted to receive the lens-fastening screws.

The two arms 1 are interconnected by a bridge 3. Rest plate carrying lugs 4 are also rigid with the arms 1 or with the bridge 3 which amounts to the same. The whole provides the carrying element which is rested on the wearer's nose and by which the lenses are correctly held in position before his eyes. A portion 5 indicated in checked lines is intended to receive the related bow-carrying element as will be explained hereinafter.

Fig. 2 illustrates one of the bow-carrying elements. Same consists of a curved arm 6 formed at the one end thereof with an ear for its pivotal connection with the bow. The opposite end 8 shown in checkered lines is prepared for its connection by soldering with the corresponding portion 5 of the element illustrated in Fig. 1. The said curved arm 6 upon which a suitable flexibility is conferred is capable to resiliently yield to the stress imposed upon it as the bow is swung without influencing either the shape or the position of the lens-carrying element shown in Fig. 1.

Fig. 3 illustrates the bow-carrying element assembled by soldering with the lens-carrying element. It will be appreciated that the suitably resilient curved arm 6 is capable within certain limits to temporarily yield to the stress imposed thereupon as the bow is swung open without any influence upon the shape and position of the lens-carrying element.

Figs. 4 and 5 represent the complete pair of spectacles fitted with lenses; Fig. 5 shows how the reaction created by rough manipulation of the bows is dampened from the soldered portion 8 by the resiliency of the arms 6.

Various modifications may be made within the scope of the invention in the construction of the spectacles. Thus, the rest plate carrying lug which according to Fig. 1 is assumed to be rigid with the arm 1, may also be rigid with the bridge 3 or even with the arm 6 shown in Fig. 2 since a deformation of said arm 6 will only occur on this side of the soldered portion 8. Fig. 6 illustrates such a modification which is advantageous from the viewpoint of appearance.

The glass which as shown in Fig. 1 is secured to the arm 1 by means of a pair of ears may also be secured in any conventional or new manner, e. g. by means of clips or hooks, or a frame or any other suitable combination.

For instance, the arm 1 shown in Fig. 1 may provide the upper portion of a frame in which the lens is fitted.

It has already been stated that the lens-carrying element is assembled with each bow-carrying element by soldering at the places identified by 5 in Fig. 1 and 8 in Fig. 2.

Optionally, the assemblage may be effected in any other way e. g. by means of screws or rivets.

Instead of the lens-carrying element comprising a bridge 3 soldered to the arms 1 as shown in Fig. 1 same may be made as one single piece with a through bar of which the middle portion is suitably bent to provide the bridge.

Spectacles according to the invention may be made of any suitable material. The various parts may be made of different materials; by way of non-limitary example, the lens-carrying element may be made of plastics and the bow-carrying elements of an ally, the elements then being assembled by means of rivets or screws projecting through the plastic material or in any other suitable manner.

Visible in each of Figs. 7 to 11, is the lens-carrying element which serves on the one hand to hold the lenses by means of a clip or a frame system and on the other hand with the aid of the rest plates provided to locate said lenses on the wearer's face in correct sighting position.

Visible also in the figures is the bow-carrying element, of which the connection with the lens-carrying element will be explained later on.

Fig. 7 shows a lens-carrying element composed of the bridge 3, the arms 1 formed with the lens-holding ears and the rest plate carrying arms 4. The bow carrying element is composed of an arm 6 to the ends of which the bows are attached and which is secured in its middle portion to the bridge of the lens-carrying element.

Fig. 8 illustrates a lens-carrying element composed of the bridge 3, the rest plate carrying arms 4, the frames 8 in which the lenses are set and which are interconnected by the bar 9. The bow-carrying element is composed of the bar 6 to the ends of which the bows are secured and which is secured in its central portion to the central portion of the bar 9.

Fig. 9 shows a further embodiment of a frameless pair of spectacles. The bow-carrying bar 6 is retained. As to the lens-carrying element, it is composed of the bridge 3 which is suitably bent to match the bent central portion of the bar 6 and each end of which is formed with an offshoot providing the rest plate support and with a pair of ears 2 to each of which one of the lenses is secured either as usual by means of screws or with the aid of the system illustrated in Fig. 10.

Fig. 10 shows a preferred embodiment of the lens-carrying element to be assembled with the bow-carrying bar 6 of Fig. 3.

In this arrangement, the ends of the bridge 3 which are formed with twin ears 2 are assembled firstly with the ends of the rest plate carrying arms which likewise are formed with twin ears, then with cushioning washers 10, then with the lens 11 and finally with cushioning washers 10 on which rest the heads of hollow tapped rivet-like anchoring members 12 with the aid of which the various parts are pulled together to a rigid whole by means of screws 13.

The arrangement is shown in cross-sectional view in Fig. 11.

Although for the sake of clarity the invention has been described by the way of concrete examples, it nevertheless lends itself to modifications consistent with the possibilities of the eyeglass-making industry. Thus, clip and frame systems have been described in connection with the assemblage of the lenses with the lens-carrying element. This is not exclusive of the adoption of all other suitable systems, for instance such as those in which the lens is gripped by combinations of claws with notches cut in the edge of the lens.

Likewise, the lens-carrying element also serves to position the spectacles on the wearer's face, in view of which the use of rest plates has been referred to in the specification. It will be appreciated that any other rest system, e. g. such as a so-called "saddle bridge," may be used.

The way in which the lens-carrying element is assembled with the bow-carrying element has not been specified since such an assemblage may be achieved in any suitable manner, e. g. by screwing, riveting, soldering or any other method. The areas involved in the connection are denoted by checkered lines in the figures.

What we claim is:

A spectacle frame provided with bows, a bridge and bow-carrying arms, said bow-carrying arms capable of being flexibly moved forward and rearwards of the lenses without substantially affecting the position of the lenses and the bridge comprising tapered, flexible bow-carrying arms, lens-carrying arms curving upwardly and outwardly from the bridge and in contact with the lenses, said bow-carrying arms secured by solder to the corresponding nasal ends of the lens-carrying arms and forward of said lens-carrying arms, said bow-carrying arms curving upwardly and outwardly from the lens-carrying arms in continually diverging paths from the corresponding lens-carrying arms, said bow-carrying arms adapted to be connected at their outer extremities to the bow.

PIERRE GARDISSARD.
MARCEL DELORME.

REFERENCES CITED

The following references are of record in the file of this patent:

UNITED STATES PATENTS

| Number | Name | Date |
| --- | --- | --- |
| 2,236,565 | Cozzens | Apr. 1, 1941 |
| 2,246,507 | Cozzens | June 24, 1941 |
| 2,518,914 | Lissac | Aug. 15, 1950 |

FOREIGN PATENTS

| Number | Country | Date |
| --- | --- | --- |
| 613,843 | Great Britain | Dec. 3, 1948 |
| 615,272 | Great Britain | Jan. 4, 1949 |